United States Patent Office 3,310,577
Patented Mar. 21, 1967

3,310,577
TERTIARY FERROCENYLPHENYL-PHOSPHINES
Gilbert P. Sollott, Plymouth Meeting, Pa., assignor to the United States of America as represented by the Secretary of the Army
No Drawing. Filed July 16, 1963, Ser. No. 295,564
5 Claims. (Cl. 260—439)

The invention described herein may be manufactured and used by or for the Government for governmental purposes without the payment to me of any royalty thereon.

This invention relates to tertiary phosphines of ferrocene and the preparation thereof by Friedel-Crafts reactions. More particularly, the invention relates to unsymmetrical tertiary ferrocenylphenylphosphines and the preparation thereof by reaction of ferrocene with aromatic acid chlorides of phosphorus under Friedel-Crafts conditions.

The structure of the ferrocene reactant (bis-cyclopentadienyliron) has been reported in the literature by Wilkinson et al., "Journal of the American Chemical Society," vol. 74, page 2125 (1952), and may be described as a sandwich-type structure having an iron atom between two staggered cyclopentadiene rings as shown below:

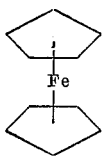

In general, tertiary ferrocenylphenylphosphines find use as metal extractants, and may be used in much the same manner as chelating agents. Inventive products also find widespread use in the field of compound synthesis as intermediates. In this respect the inventive products may be used as intermediates in the formation of quaternary salts, in halogenation reactions to form phosphine dihalides, in oxidization reactions to form phosphine oxides, in reactions with sulphur to form phosphine sulfides, and in the formation of metal salt complexes.

In the usual preparation of unsymmetrical tertiary phosphines, Grignard or lithium reagents interact with phosphonous dichlorides (RPCl₂) or phosphinous chlorides (R₂PCl). The reactions which occur may be formally expressed by the following equations, wherein R and R'=aliphatic or aromatic radicals, R and R' being different from each other, and X=a halide, usually Br:

$$R'MgX + R_2PCl \rightarrow R_2R'P + MgXCl$$

$$2R'Li + RPCl_2 \rightarrow RR'_2P + 2LiCl$$

The above processes may be used for the preparation of unsymmetrical tertiary-phosphines of ferrocene, and are typical of available prior art methods of synthesis. Unfortunately, these methods are attended by serious disadvantages. A principal disadvantage is the necessity of tedious and time-consuming multi-step syntheses in order to prepare the intermediate metallic derivatives of ferrocene. This is illustrated by the two-step preparation of lithioferrocene:

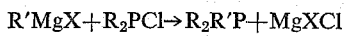
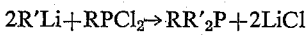
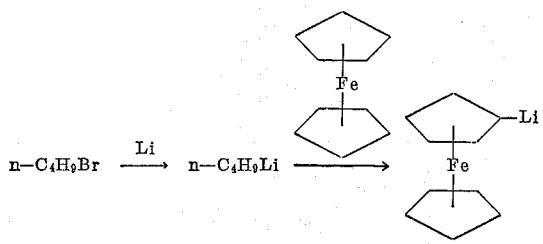

The preparation of the Grignard reagent of ferrocene involves three more steps:

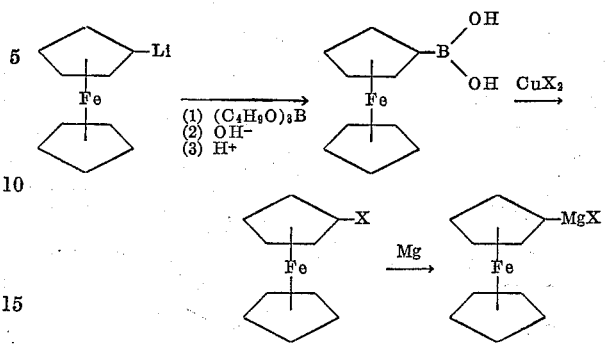

Another disadvantage is the occurrence of complicating and interfering side reactions. The lithiation of ferrocene also produces dilithioferrocene:

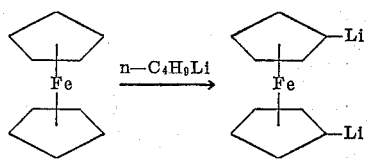

Moreover, the preparation of lithioferrocene requires the use of a three-fold excess of normal butyllithium with the result that the excess normal butyllithium can undergo the same type of reaction which the lithioferrocene is intended to undergo:

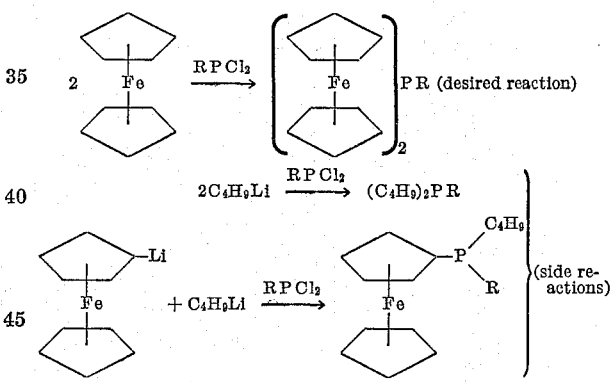

As a result of the aforementioned multi-step syntheses and complicating side reactions, a further disadvantage manifests itself in necessarily low overall yields of desired products. For example, preparation using the Li reagent should result in an overall yield of only about 25%, whereas preparation with the Grignard reagent should reduce the overall yield to only about 10%.

Accordingly, a principal object of the invention is to provide new and useful compounds comprising unsymmetrical tertiary phosphines of ferrocene.

Another object of the invention is to provide an improved method for preparation of unsymmetrical tertiary phosphines of ferrocene by Friedel-Crafts reactions.

A further object of the invention is to provide an improved method for the preparation of unsymmetrical tertiary phenylphosphines of ferrocene by reaction of ferrocene with aromatic acid chlorides of phosphorus under Friedel-Crafts conditions.

Other objects of the invention will in part be obvious and in part appear hereinafter in the following detailed description.

In the course of the investigations leading to the present invention, it was attempted to prepare unsymmetrical tertiary phosphines of ferrocene by allowing ferrocene to react with aromatic acid chlorides of phosphorus under Friedel-Crafts conditions. Accordingly, ferrocene was refluxed 20 hours in n-heptane with separate quantities of phenylphosphonous dichloride ($C_6H_5PCl_2$) and diphenylphosphinous chloride ($(C_6H_5)_2PCl$) in the presence of anhydrous aluminum chloride. The reactions are expressed by the following equations:

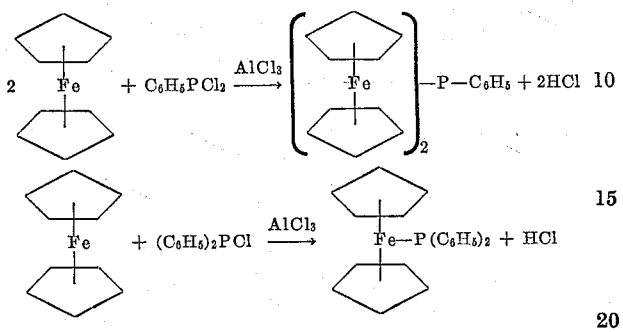

It is important to note that formation of the tertiary ferrocenylphenylphosphines in 65–75% yields is accomplished without utilizing metallic derivatives of ferrocene, and essentially in a single step process. In addition, comparison of overall yields of desired products leaves no doubt as to the superiority of the inventive method.

Having thus described the invention so that others skilled in the art may be able to understand and practice the same, it will be further understood that the invention is not limited to the preferred embodiment but may be otherwise embodied or practiced within the scope of the following claims.

I claim:

1. An improved method for the preparation of tertiary phenylphosphines of ferrocene comprising reacting ferrocene with a compound selected from the group consisting of phenylphosphonous dichloride and diphenylphosphinous chloride in the presence of anhydrous aluminum chloride.

2. A method for the preparation of diferrocenylphenylphosphine comprising reacting ferrocene with phenylphosphonous dichloride in the presence of anhydrous aluminum chloride.

3. A method for the preparation of ferrocenyldiphenylphosphine comprising reacting ferrocene with diphenylphosphinous chloride in the presence of anhydrous aluminum chloride.

4. Unsymmetrical tertiary phosphines of ferrocene having the structural formula

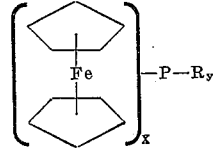

wherein $x$ and $y$ are subscripts selected from the group consisting of 1 and 2, $x$ being unequal to $y$, and R is a radical selected from the group consisting of phenyl and homologues thereof.

5. Unsymmetrical tertiary phosphines of ferrocene according to claim 4 wherein R is a phenyl group.

References Cited by the Examiner

English Abstract of article by Titov et al., Dok. Akad. Nauk SSSR, 1960, vol. 130, No. 2, pages 341–343.

Sollott et al.: (I) J. Organic Chem., vol. 27, page 4034 to 4040, November 1962.

Sollott et al.: (II) Ibid., vol. 28, No. 4, page 1090–1092, April 1963.

TOBIAS E. LEVOW, *Primary Examiner.*

E. C. BARTLETT, A. P. DEMERS, *Assistant Examiners.*